US012627539B2

(12) United States Patent
Ali et al.

(10) Patent No.: US 12,627,539 B2
(45) Date of Patent: May 12, 2026

(54) CONFIGURATIONS CORRESPONDING TO INTER-CARRIER INTERFERENCE

(71) Applicant: Lenovo (Singapore) Pte. Ltd., New Tech Park (SG)

(72) Inventors: Ali Ramadan Ali, Kraiburg am Inn (DE); Ankit Bhamri, Rödermark (DE); Sher Ali Cheema, Ilmenau (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 306 days.

(21) Appl. No.: 18/549,779

(22) PCT Filed: Mar. 4, 2022

(86) PCT No.: PCT/IB2022/051904
§ 371 (c)(1),
(2) Date: Sep. 8, 2023

(87) PCT Pub. No.: WO2022/189914
PCT Pub. Date: Sep. 15, 2022

(65) Prior Publication Data
US 2024/0187288 A1    Jun. 6, 2024

Related U.S. Application Data

(60) Provisional application No. 63/158,194, filed on Mar. 8, 2021.

(51) Int. Cl.
*H04L 25/08* (2006.01)
*H04L 5/00* (2006.01)
(Continued)

(52) U.S. Cl.
CPC ...... *H04L 25/03821* (2013.01); *H04L 5/0051* (2013.01)

(58) Field of Classification Search
None
See application file for complete search history.

(56) References Cited

U.S. PATENT DOCUMENTS

| | | | | |
|---|---|---|---|---|
| 10,938,610 | B2* | 3/2021 | Li | H04L 5/0048 |
| 2019/0044673 | A1* | 2/2019 | Maleki | H04L 5/0051 |

(Continued)

FOREIGN PATENT DOCUMENTS

| | | |
|---|---|---|
| CN | 110024322 A | 7/2019 |
| WO | 2004023752 A1 | 3/2004 |
| WO | 2020061938 A1 | 4/2020 |

OTHER PUBLICATIONS

PCT/IB2022/051904, "International Search Report and the Written Opinion of the International Searching Authority, or the Declaration", International Searching Authority, Jun. 8, 2022, pp. 1-13.

(Continued)

*Primary Examiner* — Duc T Duong
(74) *Attorney, Agent, or Firm* — Kunzler Needham Hilton

(57) ABSTRACT

Apparatuses, methods, and systems are disclosed for configurations corresponding to inter-carrier interference. One method includes receiving, at a user equipment (UE), first configuration information for reference signals for performing inter-carrier interference (ICI) estimation including time-frequency resources, a multiplexing pattern, a time-domain behavior, or some combination thereof. The method includes receiving second configuration information for reporting ICI. The second configuration information includes instances of the reference signals for ICI estimation, the time-frequency resources for reporting, the time-domain behavior for reporting, or some combination thereof. The method includes measuring the ICI due to phase noise. The method includes transmitting the ICI report. The method includes receiving third configuration information
(Continued)

1100

Begin

1102 — Receive First Configuration Information For Reference Signals For Performing Inter-Carrier Interference (ICI) Estimation Including Time-Frequency Resources, A Multiplexing Pattern, A Time-Domain Behavior, Or Some Combination Thereof 1104 — Receive Second Configuration Information For Reporting ICI, Wherein The Second Configuration Information Comprises Instances Of The Reference Signals For ICI Estimation, The Time-Frequency Resources For Reporting, The Time-Domain Behavior For Reporting, Or Some Combination Thereof 1106 — Measure The ICI Due To Phase Noise 1108 — Transmit The ICI Report 1110 — Receive Third Configuration Information For Performing ICI Pre-Distortion And Phase-Tracking Reference-Signal (PT-RS) Adaptation End for performing ICI pre-distortion and phase-tracking reference-signal (PT-RS) adaptation.

20 Claims, 12 Drawing Sheets

(51) Int. Cl.
H04L 25/03 (2006.01)
H04W 72/232 (2023.01)

(56) References Cited

U.S. PATENT DOCUMENTS

| | | | | |
|---|---|---|---|---|
| 2019/0327056 | A1* | 10/2019 | Chen | H04L 5/00 |
| 2020/0076537 | A1* | 3/2020 | Sun | H04J 11/005 |
| 2020/0153580 | A1 | 5/2020 | Hessler et al. | |
| 2020/0220755 | A1* | 7/2020 | Maki | H04L 27/2675 |
| 2020/0295893 | A1* | 9/2020 | Maki | H04L 5/0073 |
| 2021/0044372 | A1* | 2/2021 | Yang | H04L 27/2613 |
| 2021/0273759 | A1* | 9/2021 | Maki | H04L 1/0003 |
| 2022/0085908 | A1* | 3/2022 | Shaked | H04L 27/2646 |
| 2022/0109601 | A1* | 4/2022 | Zewail | H04L 27/2662 |
| 2022/0141064 | A1* | 5/2022 | Horn | H04W 72/23 |
| | | | | 370/329 |
| 2022/0337461 | A1* | 10/2022 | Liu | H04L 5/0048 |
| 2023/0104253 | A1* | 4/2023 | Ali | H04L 5/0092 |
| | | | | 370/329 |

OTHER PUBLICATIONS

Armada, "Estimation and correction of Phase Noise effects in Orthogonal Frequency Division Multiplexing", IEEE Globecom, 2006, pp. 1-6.

National Instruments, "Discussion on explicit and implicit signaling for PT-RS", 3GPP TSG RAN WG1 Meeting #89 R1-1708272, May 15-19, 2017, pp. 1-11.

Ericsson, "On Phase Noise Compensation for OFDM", 3GPP TSG-RAN WG1 Meeting #102-e R1-2005922, Aug. 17-28, 2020, pp. 1-7.

Moderator (Vivo), "Discussion summary #2 of [104-e-NR-52-71GHz-05]", 3GPP TSG RAN WG1 Meeting #104-e R1-2102072, Jan. 25-Feb. 5, 2021, pp. 1-109.

3GPP, "3rd Generation Partnership Project; Technical Specification Group Radio Access Network; NR; Physical channels and modulation (Release 16)", 3GPP TS 38.211 V16.4.0, Dec. 2020, pp. 1-133.

3GPP, "3rd Generation Partnership Project; Technical Specification Group Radio Access Network; NR; Physical layer procedures for data (Release 16)", 3GPP TS 38.214 V16.4.0, Dec. 2020, pp. 1-169.

* cited by examiner

100

104

104

102

104

102

102

200

400

422          426

| DL<br>K=2<br>L=1<br>402 | DL<br>K=2<br>L=1<br>404 | DL<br>K=2<br>L=1<br>406 | UL<br>K=2<br>L=1<br>408 | DL<br>K=1/4<br>L=1<br>410 | UL<br>K=2<br>L=1<br>412 | DL<br>K=4<br>L=4<br>414 | UL<br>K=4<br>L=4<br>416 | DL<br>K=4<br>L=4<br>418 |

420          424          428

500

504

502

600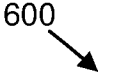
604
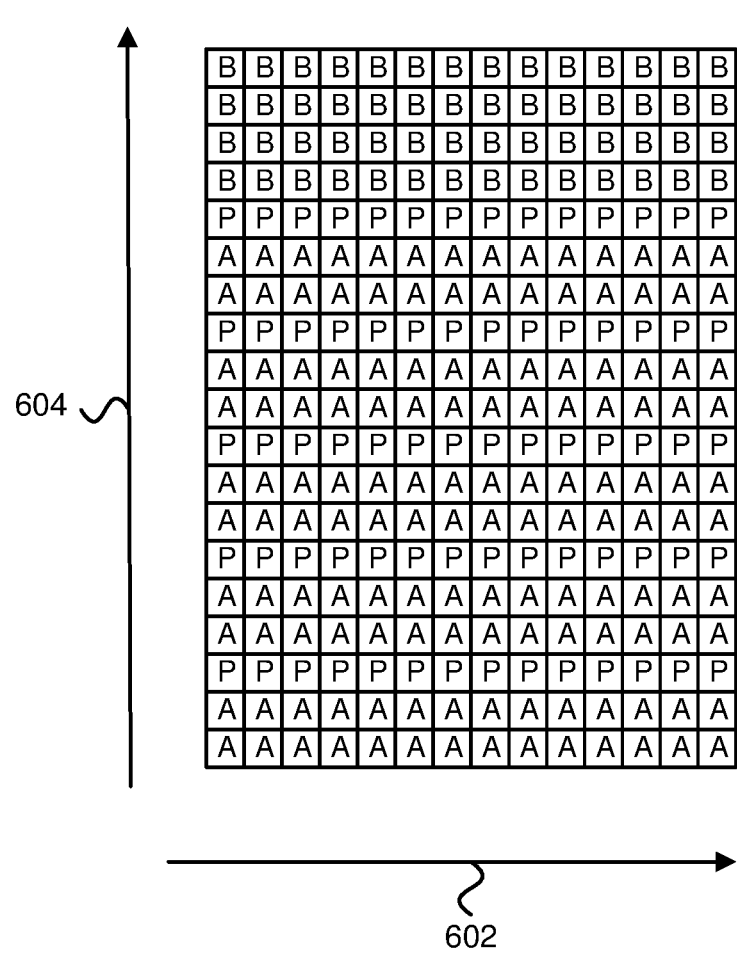
602
FIG. 6

700

704

702

800

900

904

902

1100

```
                    ┌─────────────┐
                    │    Begin    │
                    └──────┬──────┘
                           │
                           ▼
        ┌──────────────────────────────────────────┐
        │ Receive First Configuration Information    │
        │ For Reference Signals For Performing       │
        │ Inter-Carrier Interference (ICI)           │
 1102   │ Estimation Including Time-Frequency        │
        │ Resources, A Multiplexing Pattern, A       │
        │ Time-Domain Behavior, Or Some              │
        │ Combination Thereof                        │
        └──────────────────┬───────────────────────┘
                           │
                           ▼
        ┌──────────────────────────────────────────┐
        │ Receive Second Configuration Information   │
        │ For Reporting ICI, Wherein The Second      │
        │ Configuration Information Comprises        │
        │ Instances Of The Reference Signals For ICI │
 1104   │ Estimation, The Time-Frequency Resources   │
        │ For Reporting, The Time-Domain Behavior    │
        │ For Reporting, Or Some Combination Thereof │
        └──────────────────┬───────────────────────┘
                           │
                           ▼
 1106   ┌──────────────────────────────────────────┐
        │      Measure The ICI Due To Phase Noise    │
        └──────────────────┬───────────────────────┘
                           │
                           ▼
 1108   ┌──────────────────────────────────────────┐
        │            Transmit The ICI Report         │
        └──────────────────┬───────────────────────┘
                           │
                           ▼
        ┌──────────────────────────────────────────┐
        │ Receive Third Configuration Information    │
 1110   │ For Performing ICI Pre-Distortion And      │
        │ Phase-Tracking Reference-Signal (PT-RS)    │
        │ Adaptation                                 │
        └──────────────────┬───────────────────────┘
                           │
                           ▼
                    ┌─────────────┐
                    │     End     │
                    └─────────────┘
```

CONFIGURATIONS CORRESPONDING TO INTER-CARRIER INTERFERENCE

CROSS-REFERENCE TO RELATED APPLICATIONS

This application claims priority to U.S. Patent Application Ser. No. 63/158,194 entitled "APPARATUSES, METHODS, AND SYSTEMS FOR PT-RS REPORTING FOR PT-RS ADAPTATION" and filed on Mar. 8, 2021 for Ali Ramadan Ali, which is incorporated herein by reference in its entirety.

FIELD

The subject matter disclosed herein relates generally to wireless communications and more particularly relates to configurations corresponding to inter-carrier interference.

BACKGROUND

In certain wireless communications networks, high density phase tracking references signals may be used in conjunction with inter-carrier interference. In such networks, there may be reduced spectral efficiency.

BRIEF SUMMARY

Methods for configurations corresponding to inter-carrier interference are disclosed. Apparatuses and systems also perform the functions of the methods. One embodiment of a method includes receiving, at a user equipment (UE), first configuration information for reference signals for performing inter-carrier interference (ICI) estimation including time-frequency resources, a multiplexing pattern, a time-domain behavior, or some combination thereof. In some embodiments, the method includes receiving second configuration information for reporting ICI. The second configuration information includes instances of the reference signals for ICI estimation, the time-frequency resources for reporting, the time-domain behavior for reporting, or some combination thereof. In certain embodiments, the method includes measuring the ICI due to phase noise. In various embodiments, the method includes transmitting the ICI report. In some embodiments, the method includes receiving third configuration information for performing ICI pre-distortion and phase-tracking reference-signal (PT-RS) adaptation.

One apparatus for configurations corresponding to inter-carrier interference includes a user equipment (UE). In some embodiments, the apparatus includes a receiver that: receives first configuration information for reference signals for performing inter-carrier interference (ICI) estimation including time-frequency resources, a multiplexing pattern, a time-domain behavior, or some combination thereof: and receives second configuration information for reporting ICI. The second configuration information includes instances of the reference signals for ICI estimation, the time-frequency resources for reporting, the time-domain behavior for reporting, or some combination thereof. In various embodiments, the apparatus includes a processor that measures the ICI due to phase noise. In certain embodiments, the apparatus includes a transmitter that transmits the ICI report. In some embodiments, the receiver receives third configuration information for performing ICI pre-distortion and phase-tracking reference-signal (PT-RS) adaptation.

Another embodiment of a method for configurations corresponding to inter-carrier interference includes transmitting, from a network device, first configuration information for reference signals for performing inter-carrier interference (ICI) estimation including time-frequency resources, a multiplexing pattern, a time-domain behavior, or some combination thereof. In some embodiments, the method includes transmitting second configuration information for reporting ICI. The second configuration information includes instances of the reference signals for ICI estimation, the time-frequency resources for reporting, the time-domain behavior for reporting, or some combination thereof. In certain embodiments, the method includes receiving the ICI report. In various embodiments, the method includes transmitting third configuration information for performing ICI pre-distortion and phase-tracking reference-signal (PT-RS) adaptation.

Another apparatus for configurations corresponding to inter-carrier interference includes a network device. In some embodiments, the apparatus includes a transmitter that: transmits first configuration information for reference signals for performing inter-carrier interference (ICI) estimation including time-frequency resources, a multiplexing pattern, a time-domain behavior, or some combination thereof: and transmits second configuration information for reporting ICI. The second configuration information includes instances of the reference signals for ICI estimation, the time-frequency resources for reporting, the time-domain behavior for reporting, or some combination thereof. In various embodiments, the apparatus includes a receiver that receives the ICI report. In certain embodiments, the transmitter transmits third configuration information for performing ICI pre-distortion and phase-tracking reference-signal (PT-RS) adaptation.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIGS. 5 through 7 are schematic block diagrams illustrating embodiments for high density PT-RS for PN-ICI estimation;

FIG. 11 is a flow chart diagram illustrating one embodiment of a method for configurations corresponding to inter-carrier interference.

DETAILED DESCRIPTION

Figure 1:
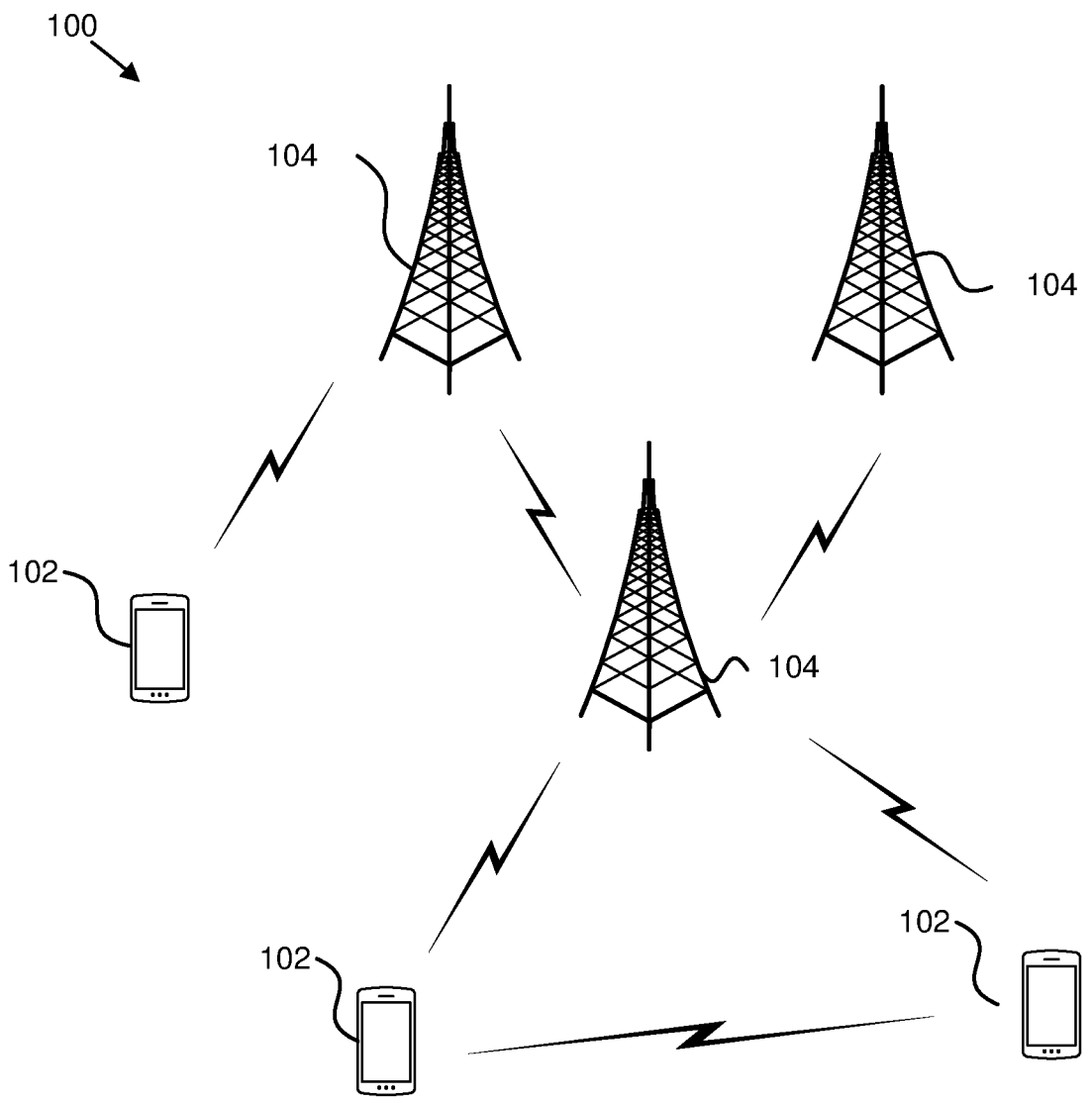
FIG. 1 is a schematic block diagram illustrating one embodiment of a wireless communication system for configurations corresponding to inter-carrier interference.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for configurations corresponding to inter-carrier interference. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE")

802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive, at a user equipment (UE), first configuration information for reference signals for performing inter-carrier interference (ICI) estimation including time-frequency resources, a multiplexing pattern, a time-domain behavior, or some combination thereof. In some embodiments, the remote unit 102 may receive second configuration information for reporting ICI. The second configuration information includes instances of the reference signals for ICI estimation, the time-frequency resources for reporting, the time-domain behavior for reporting, or some combination thereof. In certain embodiments, the remote unit 102 may measure the ICI due to phase noise. In various embodiments, the remote unit 102 may transmit the ICI report. In some embodiments, the remote unit 102 may receive third configuration information for performing ICI pre-distortion and phase-tracking reference-signal (PT-RS) adaptation. Accordingly, the remote unit 102 may be used for configurations corresponding to inter-carrier interference.

In certain embodiments, a network unit 104 may transmit, from a network device, first configuration information for reference signals for performing inter-carrier interference (ICI) estimation including time-frequency resources, a multiplexing pattern, a time-domain behavior, or some combination thereof. In some embodiments, the network unit 104 may transmit second configuration information for reporting ICI. The second configuration information includes instances of the reference signals for ICI estimation, the time-frequency resources for reporting, the time-domain behavior for reporting, or some combination thereof. In certain embodiments, the network unit 104 may receive the ICI report. In various embodiments, the network unit 104 may transmit third configuration information for performing ICI pre-distortion and phase-tracking reference-signal (PT-RS) adaptation. Accordingly, the network unit 104 may be used for configurations corresponding to inter-carrier interference.

Figure 2:
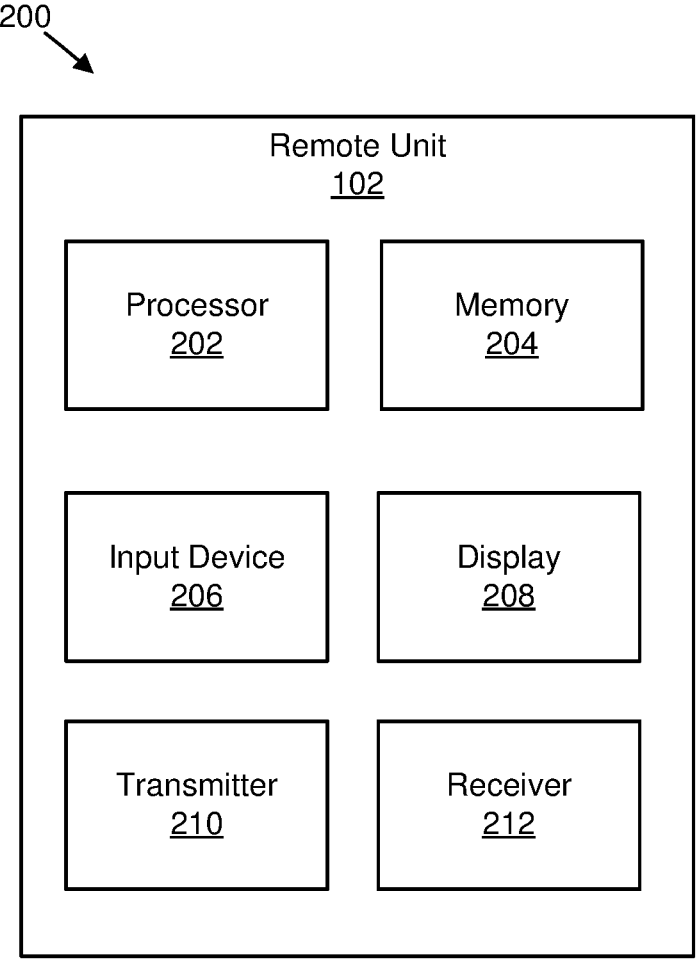
FIG. 2 is a schematic block diagram illustrating one embodiment of an apparatus that may be used for configurations corresponding to inter-carrier interference.

FIG. 2 depicts one embodiment of an apparatus 200 that may be used for configurations corresponding to inter-carrier interference. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations.

For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the receiver 212: receives first configuration information for reference signals for performing inter-carrier interference (ICI) estimation including time-frequency resources, a multiplexing pattern, a time-domain behavior, or some combination thereof: and receives second configuration information for reporting ICI. The second configuration information includes instances of the reference signals for ICI estimation, the time-frequency resources for reporting, the time-domain behavior for reporting, or some combination thereof. In various embodiments, the processor 202 measures the ICI due to phase noise. In certain embodiments, the transmitter 210 transmits the ICI report. In some embodiments, the receiver 212 receives third configuration information for performing ICI pre-distortion and phase-tracking reference-signal (PT-RS) adaptation.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
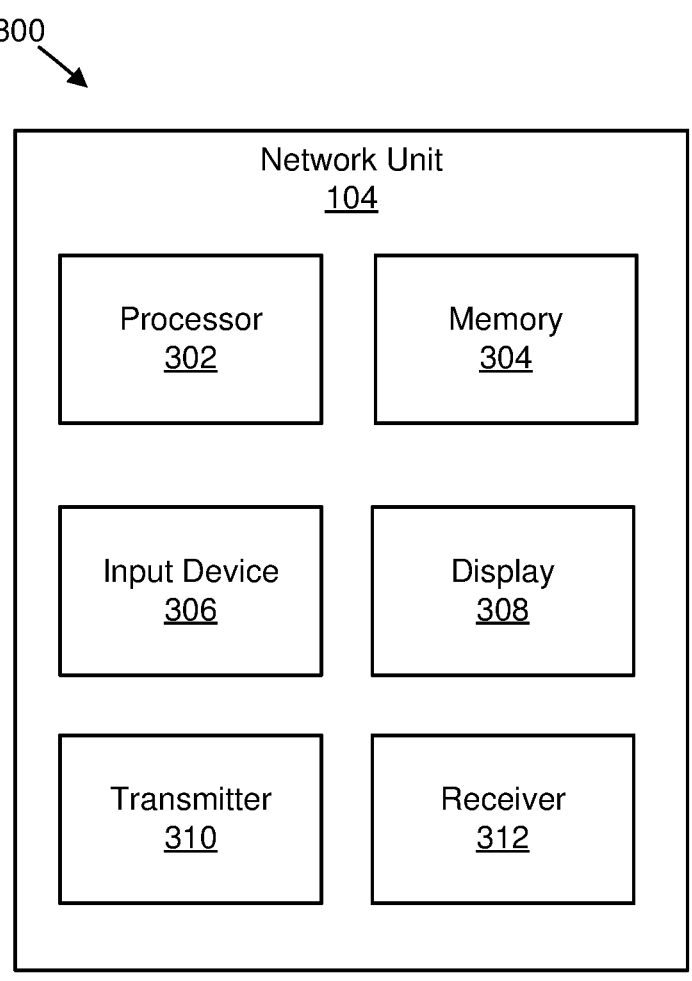
FIG. 3 is a schematic block diagram illustrating one embodiment of an apparatus that may be used for configurations corresponding to inter-carrier interference.

FIG. 3 depicts one embodiment of an apparatus 300 that may be used for configurations corresponding to inter-carrier interference. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310: transmits first configuration information for reference signals for performing inter-carrier interference (ICI) estimation including time-frequency resources, a multiplexing pattern, a time-domain behavior, or some combination thereof: and transmits second configuration information for reporting ICI. The second configuration information includes instances of the reference signals for ICI estimation, the time-frequency resources for reporting, the time-domain behavior for reporting, or some combination thereof. In various embodiments, the receiver 312 receives the ICI report. In certain embodiments, the transmitter 310 transmits third configuration information for performing ICI pre-distortion and phase-tracking reference-signal (PT-RS) adaptation.

It should be noted that one or more embodiments described herein may be combined. In certain embodiments, phase tracking reference signals ("PT-RSs") are configured for downlink ("DL") and uplink ("UL") as a function of a configured modulation and coding scheme ("MCS") and configured resource blocks ("RBs") for a certain user equipment ("UE"), so that the PT-RS configuration is UE specific. However, it doesn't rely on the phase noise level or the variation of the phase noise of a receiver ("RX") or a transmit ("TX") radio frequency ("RF") front end due to temperature or other factors in the RF circuitry. For high frequency bands (e.g., between 52.6 GHz-71 GHz or beyond), a phase noise level is expected to be much larger and may introduce high inter-carrier interference ("ICI") between a cyclic prefix ("CP") orthogonal frequency division multiplexing ("OFDM") ("CP-OFDM") or discrete Fourier transform ("DFT") spread OFDM ("DFT-s-OFDM") sub-carriers. To cope with this effect, a combination of using high sub-carrier spacing ("SCS"), namely 960 KHz and 480 KHz along with an enhanced PT-RS configuration may be used. In some embodiments, using high density PT-RS to cope with the high ICI (e.g., for high MCS values) may lead to reduced spectral efficiency. Reduced density may decrease the performance or lead to complex ICI compensation at the UE to reach a certain level of performance. Furthermore, a fixed PT-RS configuration as a function of only MCS, subcarrier spacing ("SCS") and a number of resource blocks ("RBs") may not be an optimal solution since the level of phase noise ("PN") may change over time due to temperature or other RF effects.

In various embodiments, PT-RS may be enhanced by performing adaptive PT-RS configuration and/or sharing based on ICI reporting. PT-RS may be enhanced by: 1) different configurations of PT-RS for accurate estimation of the ICI caused by phase noise by one UE or a combined ICI estimation by multiple UEs: 2) enhancing UE-based reporting to report a new quantity, such as ICI with different granularities, based on a size of an ICI matrix: 3) adapting a PT-RS configuration based on an ICI power level reported to separate the ICI caused by only phase noise (e.g., use static and/or low-mobility UEs for ICI based on only phase noise): and/or 4) ICI pre-coding and/or pre-distortion for DL and/or UL based on reported ICI coefficients from static and/or low mobility UEs.

Figure 4:
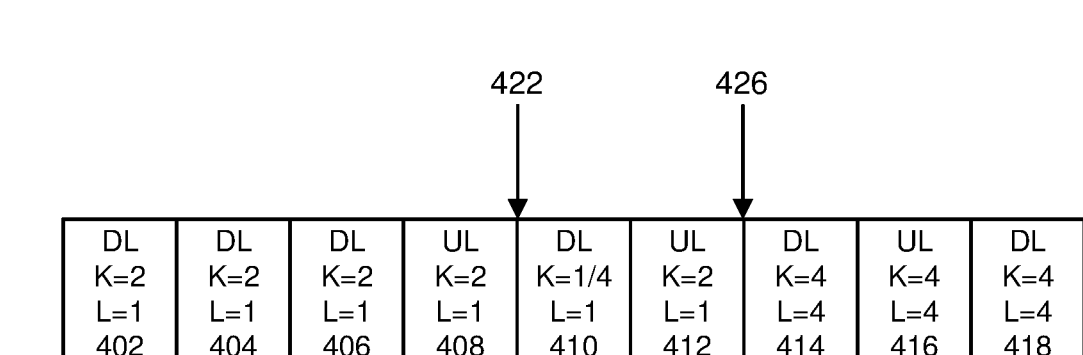
FIG. 4 is a schematic block diagram illustrating one embodiment of a procedure for adapting a PT-RS configuration.

FIG. 4 is a schematic block diagram illustrating one embodiment of a procedure 400 for adapting a PT-RS configuration, where UEs with low mobility report their observed ICI to a gNB and the gNB adapts the PT-RS of multiple UEs according to the reported ICI level and/or pre-codes and/or pre-distorts the DL with the reported ICI and reduces the PT-RS density. In FIG. 4, K is a distance between RBs and L is a distance between symbols. The procedure 400 includes a first DL symbol 402, a second DL symbol 404, a third DL symbol 406, a first UL symbol 408, a fourth DL symbol 410, a second UL symbol 412, a fifth DL symbol 414, a third UL symbol 416, and a sixth DL symbol 418. At a first time 420, one or more UEs estimate and/or report mobility and/or a gNB estimates the UE mobility. Moreover, at a second time 422, the gNB sends high density PTRS (e.g., K=¼) to the selected UEs (e.g., static UEs) for accurate ICI estimation. Further, at a third time 424, the selected UEs report ICI. At a fourth time 426, the gNB precodes DL with ICI and/or updates a PTRS density to one or more UEs. Moreover, at a fifth time 428, UEs may be configured to update PTRS and/or precode UL with the ICI.

Certain embodiments described herein may enable flexible and/or adaptive configuration of PT-RSs based on observed ICI caused by phase noise. Furthermore, the ICI pre-coding and/or pre-distortion based on reported ICI from one or more UEs applied on a DL of other UEs that use similar oscillators leads to low UE receiver complexity and enables reducing a PT-RS density, hence enhancing spectral efficiency.

Figure 5:
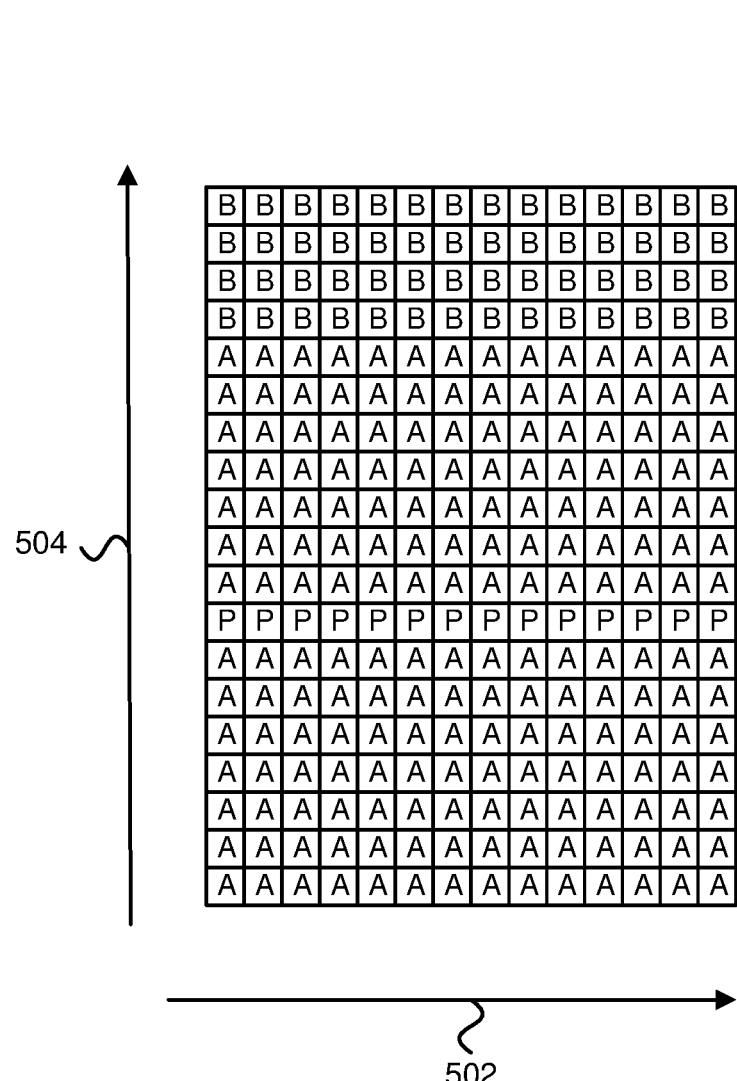
Figure 7:
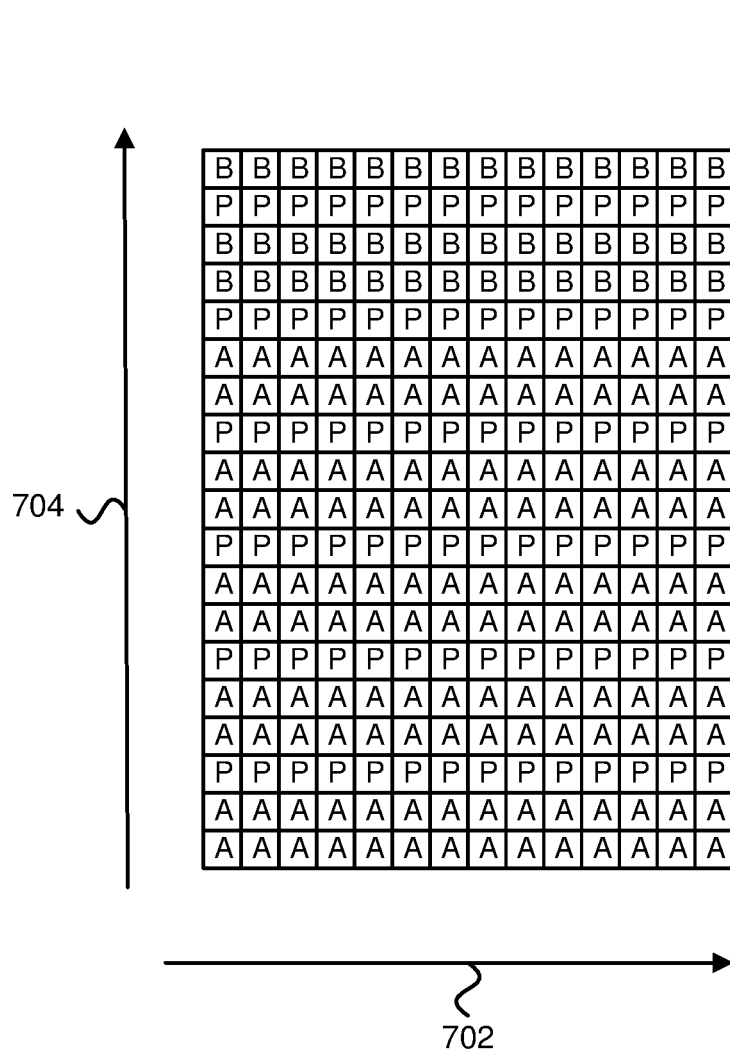

In a first embodiment, there may be a configuration for ICI estimation for a single UE. In the first embodiment, the UE receives a configuration from a base station to report ICI caused by phase noise. The gNB configures one or more of the connected UEs to report the observed ICI caused by phase noise of the gNB-TX and UE-RX oscillators on all or a subset of the allocated RBs. To separate the ICI caused by PN from one caused by Doppler, in one implementation, the gNB configures only static UEs or low mobility UEs to report their observed ICI. UE mobility may be estimated at the gNB based on measuring a time of arrival ("ToA") of UL in multiple consecutive slots or based on monitoring an amplitude variation of the UL channel. In another implementation, the UE is configured to report its mobility based on monitoring the amplitude variation of the DL channel or based on other internal sensors. In some embodiments, a UE is configured to report a flag of one bit informing a gNB about a mobility indication ("MI"), where 0 indicates that the UE is static and/or semi-static, and 1 indicates that the UE is moving. The generation of the MI bit is based on a threshold configured by the network. Upon identifying the mobility of one or more UEs, the gNB configures selected static and/or semi static UEs to report their ICI. In one implementation, the UE is configured to use the configured PT-RSs, which are signaled via radio resource control ("RRC") as a function of MCS and a number of RBs for estimating the ICI caused by phase noise. In another implementation, the UE is configured in downlink control information ("DCI") with high density PT-RS (e.g., higher than the RRC configured one) on dedicated DL slots to accurately estimate the ICI. The high density PT-RS used for ICI estimation may be mapped on the allocated DL RBs of the UE. In another implementation, the PT-RSs are allocated with larger bandwidth than the UE allocation (e.g., span the whole or subset of bandwidth parts ("BWPs") depending on an allocation of other UEs as shown in FIGS. 5 through 7). The UE may be configured with high density PT-RS over multiple slots with a predefined periodicity. The UE may be configured to trigger a MI indication with a transmission to the gNB to terminate the high density PT-RSs for PN ICI ("PN-ICI") estimation if its mobility status has changed. In one implementation, a UE can report a PT-RS configuration suggestion to the gNB based on the ICI calculation.

FIGS. 5 through 7 are schematic block diagrams illustrating embodiments for high density PT-RS for PN-ICI estimation. Specifically, FIG. 5 illustrates a BWP 500 of a default PTRS over symbols 502 and subcarriers 504 having a configuration of K=2 and L=1, showing UE allocation ("A"), PTRS ("P"), and BWP ("B") symbols. Further, FIG. 6 illustrates a BWP 600 of a high density PTRS configured for ICI estimation over symbols 602 and subcarriers 604 having a configuration of K=¼ and L=1, showing UE allocation ("A"), PTRS ("P"), and BWP ("B") symbols. Moreover, FIG. 7 illustrates a BWP 700 of a high density PTRS configured for ICI estimation over symbols 702 and subcarriers 704 having a configuration of K=¼ and L=1, showing UE allocation ("A"), PTRS ("P"), and BWP ("B") symbols.

In a second embodiment, there may be a configuration for ICI estimation using multiple UEs. In the second embodiment, multiple UEs (e.g., static and/or low mobility UEs) are configured with a common reference signal ("RS") (e.g., similar to PT-RS) which spans the bandwidth allocated to these UEs. Each UE is configured to estimate ICI on a part or on the whole bandwidth ("BW") allocated to these UEs. The gNB may combine and/or average the individual reported ICI from the multiple UEs for enhancing and/or adapting the PT-RS configuration as illustrated in FIG. 8.

Figure 8:
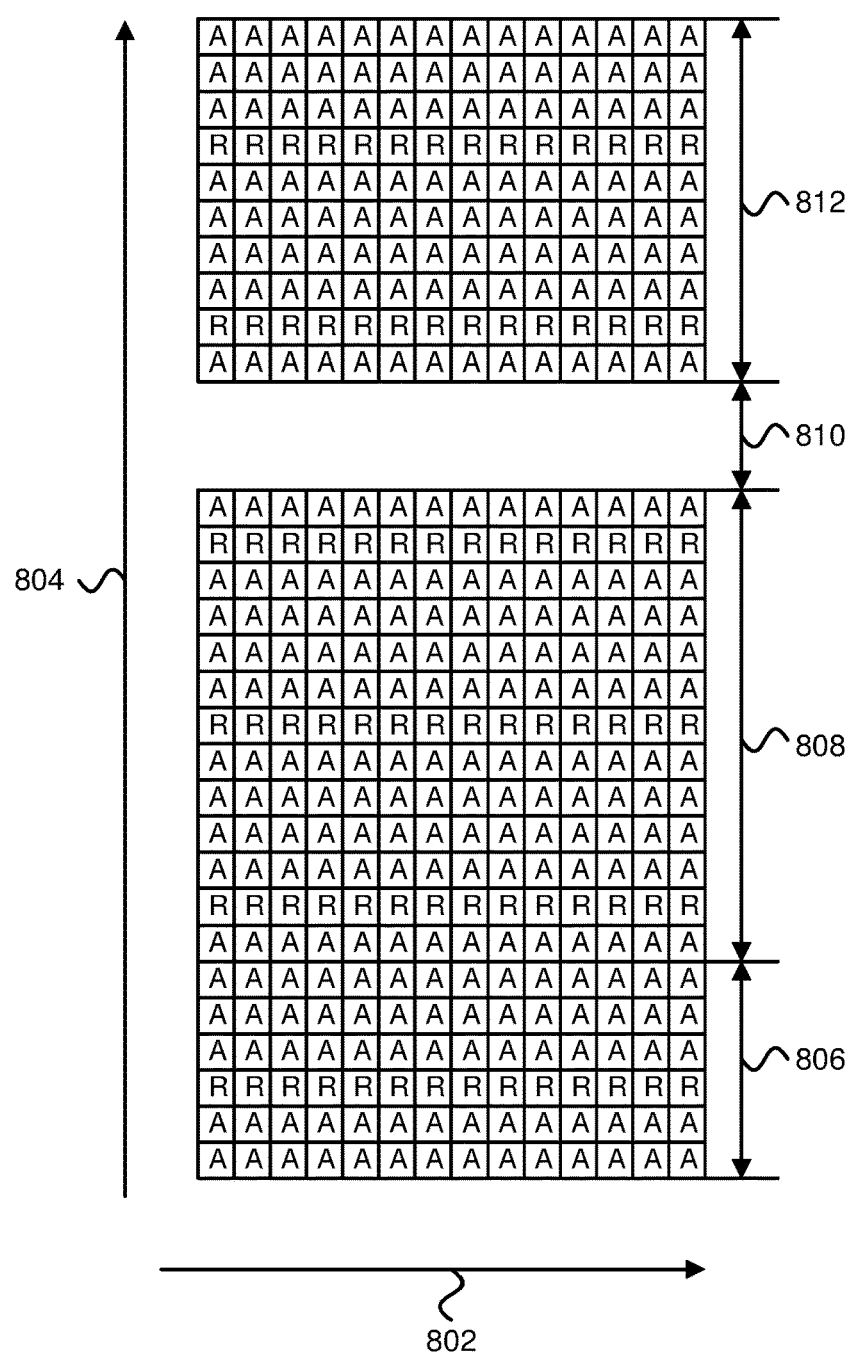
FIG. 8 is a schematic block diagram illustrating one embodiment of RBs with a common RS for multiple UEs for ICI estimation.

FIG. 8 is a schematic block diagram illustrating one embodiment of RBs 800 with a common RS for multiple UEs for ICI estimation. The RBs 800 are illustrated over symbols 802 (e.g., OFDM symbols) and subcarriers 804. The RBs 800 include UE1 RBs 806, UE2 RBs 808, an allocation 810 for other UEs not configured for ICI reporting, and UE3 RBs 812, showing UE allocation ("A") and RS ("R") (e.g., common RS for ICI estimation).

In certain embodiments, a gNB configures static UEs to map high density PT-RS in UL. The combined ICI caused by phase noise of a UE-TX and gNB-RX oscillators are estimated at the gNB.

In some embodiments, RS (e.g., either PT-RS, some new RS, or enhanced channel state information reference signal ("CSI-RS")) may be configured with a periodicity to the UE for performing measurements for ICI determination due to phase noise and perform corresponding reporting. In one implementation, the RS may be configured in addition to PT-RS, where the RS is only used for ICI related measurements and reporting.

Figure 9:
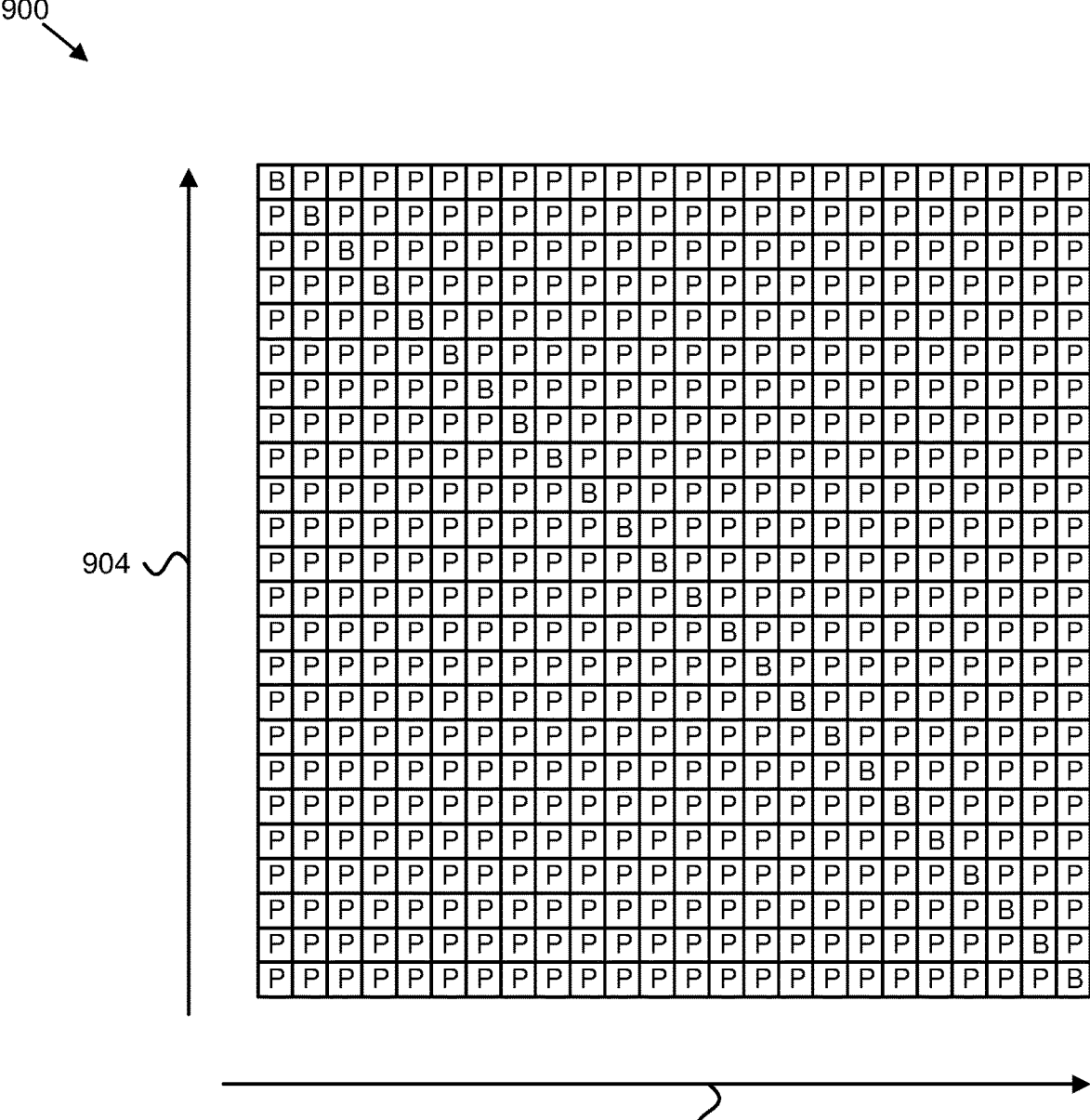
FIG. 9 is a schematic block diagram illustrating one embodiment of a reporting ICI matrix in which a UE reports full ICI coefficients.
Figure 10:
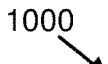
FIG. 10 is a schematic block diagram illustrating one embodiment of a reporting ICI matrix in which a UE reports some sub-diagonals of the ICI matrix.

In a third embodiment, there may be a procedure for reporting ICI. In the third embodiment, a UE (e.g., with no or low mobility) is configured to report the ICI caused by phase noise using physical uplink control channel ("PUCCH") or physical uplink shared channel ("PUSCH"). In one implementation, the UE may be configured to report the ICI matrix over all PT-RS subcarriers. An example ICI matrix of PT-RS subcarriers for one OFDM symbol is shown in FIGS. 9 and 10. The sub-diagonals of the ICI matrix contains the ICI coefficients between each PT-RS carrier, and all other carriers and the main diagonal contains the frequency fading of the channel over the PT-RS subcarriers. The main diagonal is not reported since it doesn't contain ICI coefficients. In another implementation, if the number of allocated RBs is high and the spacing of the configured PT-RS in frequency and/or time is small, the UE may be configured to quantize the ICI matrix by averaging the ICI coefficients over multiple PT-RS subcarriers or reports only part of the ICI matrix (e.g., some sub-diagonals such as D number of sub-diagonals of the matrix that are close to the main diagonal). The ICI level is high for the sub-diagonals close to the main diagonal since they represent the ICI coefficients between the D adjacent sub-carriers while ICI level decreases for far sub-diagonals (e.g., contribution from far PT-RS subcarriers to the subcarrier of interest). In another implementation, the UE is configured to average the coefficients over each reported sub-diagonal and report these averages which represent a common phase shift for each sub-diagonal. The UE, in this case, may be configured to report the main diagonal, which represents the frequency fading over all PT-RS subcarriers, of the matrix to allow the gNB to regenerate, extend, and/or interpolate for the non-reported ICI coefficients.

FIG. 9 is a schematic block diagram illustrating one embodiment of a reporting ICI matrix 900 in which a UE reports full ICI coefficients over PTRS subcarriers m 902 and PTRS subcarriers k 904 showing PTRS ("P") and non-PTRS BWP ("B"). The main diagonal is not reported, and ICI is provided between PTRS subcarrier m and subcarrier k.

FIG. 10 is a schematic block diagram illustrating one embodiment of a reporting ICI matrix 1000 in which a UE reports some sub-diagonals of the ICI matrix over PTRS subcarriers m 1002 and PTRS subcarriers k 1004 showing PTRS ("P") and non-PTRS BWP ("B"). There are D reported sub-diagonals (e.g., 3), and ICI is provided between PTRS subcarrier m and subcarrier k. In some embodiments there may be averaging over some sub-diagonal elements.

In various embodiments, a UE may be configured to report part of an ICI matrix or sub of the ICI matrix for each configured PT-RS OFDM symbol. In one implementation, the UE reports an averaged ICI matrix or sub of the ICI matrix over the PT-RS OFDM symbols or reports only the ICI power averaged over PT-RS subcarriers and OFDM symbols. In another implementation, the gNB configures time division multiplexed ("TDMed") UEs, each to report part of the ICI matrix if they use frequency overlapped RBs and/or PT-RS subcarriers over some TDMed DL slots. The UE is configured to use either PUCCH or PUSCH, if available, to report the ICI. The gNB may configure the UE to report the ICI coefficients over multiple PUCCH and/or PUSCH slots if the UE is not able to report the coefficients in one UL slot, this depends on the number of ICI coefficients to be reported and whether the quantized and/or reduced ICI report is applied and/or configured. In this case, the UE is configured to divide the coefficients estimated from the ICI-dedicated DL slot into sub-blocks each is reported in different PUCCH and/or PUSCH slots.

In a fourth embodiment, there may be shared PT-RS adaptation and ICI pre-coding and/or pre-distortion. In the fourth embodiment, UEs are grouped in some groups, for example based on their configured MCS or based on their RF capabilities, if available, in terms of the oscillator characteristics or the PN level. Upon receiving an ICI report from the selected low mobility UEs, the gNB uses the ICI matrix or ICI power level for other UEs with group characteristics similar to the low mobility UE that reported the ICI by applying common PT-RS adaptation, pre-coding, and/or predistortion of the DL physical downlink shared channel ("PDSCH") and/or physical downlink control channel ("PDCCH") of the reporting UE or part of the DL bandwidth. If pre-distortion is applied for the reporting UE, the UE may be configured with no PT-RS for some period of time (e.g., several DL slots). One example of pre-distortion is to multiply the transmitted PDSCH and/or PDCCH with the inversion of the full interpolated and/or filtered ICI matrix. Other examples may include partial distortion using a sub of the ICI matrix along with reduced PT-RS density. The pre-distortion may rely on the estimated ICI of UL at the gNB and applied to the DL by filtering the DL signal with the corresponding ICI coefficients after some calibration. In this case, the UEs are not expected to report ICI and may be configured with a specific PT-RS configuration (e.g., with high density on some dedicated UL slots for accurate ICI estimation at the gNB). In some embodiments, if the RF characteristics of some of the UEs match those of the UE that reported the ICI, the gNB may pre-distort the DL of other UEs using the ICI coefficients reported from one UE (e.g., full ICI reporting UE) and apply some calibration based on reported sub-set ICI or common phase shifts of some sub-diagonals from the other UEs. In one implementation, the gNB still sends the PT-RS, which may be with reduced density, for these UEs to allow them to compensate for the ICI to avoid the case of a small mismatch between the RF characteristics or in the case of a slight time variation of a PN level due to temperature or other RF effects. For example, for a configured PT-RS as a function of MCS, a number of RBs and/or SCS is with K=2, L=1, where L is the spacing in terms of OFDM symbols and K is the spacing in terms of RBs, then the PT-RS configuration can be relaxed when applying ICI-pre-distortion (e.g., to K=4, L=2).

In various embodiments, UEs are configured with different PT-RS density based on the ICI level reported by one or more low mobility UEs. The gNB adapts the PT-RS without pre-distortion and configures the UEs with different PT-RS configuration than the one that based on MCS and/or number of RBs with considering the configured demodulation reference signal ("DMRS"). If the reported ICI power level is high, then high density PT-RS (e.g., block based PT-RS) is configured with a transmission to the reporting UE and other UEs with similar characteristics, while if the ICI level is small, low density PT-RS is applied. The gNB may configure the same reporting UE (e.g., if it is still static and/or semi static) or other low mobility UEs to update the ICI report after some time.

In certain embodiments, adaptive PT-RS configuration is applied only to a reporting UE. This is due to the fact that PN level might be a variant depending on a temperature of an RF circuitry. The reporting UE is configured with high density PT-RS on dedicated DL slots for measuring the ICI and configured to report the estimated ICI. Upon receiving the ICI matrix and/or sub-matrix or the averaged ICI level, a gNB adapts the PT-RS configuration for the next DL slots. The number of DL slots that use different PT-RS configuration depends on the PN level variation. To be aligned with the PN level variation, the UE is configured to update the ICI report if it is still with low mobility. In one implementation, the ICI estimation and reporting may be configured for other UEs with mobility. The reported ICI would be a combined ICI caused by PN and by Doppler. The PT-RS and/or DMRS configuration can be separately and/or jointly updated for some contiguous DL slots.

In some embodiments, the UE is configured to adapt the PT-RS density of the UL transmission. In one implementation, the adaptation is based on estimating ICI on UL. In one example, the gNB configures low mobility UEs with high density PT-RS for some UL slots and upon estimating the ICI, the same or new configuration of UL PT-RS is configured to other UEs and/or a reporting UE. The gNB may configure the UE to apply ICI pre-distortion on the UL transmission. In one example, although the ICI is not exactly reciprocal for UL and DL, the relation between them can be estimated and, hence, the gNB may configure the UE to calibrate its UL ICI predistortion based on its DL ICI estimation. In another example, the gNB sends the UL ICI coefficients or subset of ICI matrix to the UE to be used for ICI pre-distortion in UL.

FIG. 11 is a flow chart diagram illustrating one embodiment of a method 1100 for configurations corresponding to inter-carrier interference. In some embodiments, the method 1100 is performed by an apparatus, such as the remote unit 102. In certain embodiments, the method 1100 may be performed by a processor executing program code, for example, a microcontroller, a microprocessor, a CPU, a GPU, an auxiliary processing unit, a FPGA, or the like.

In various embodiments, the method 1100 includes receiving 1102, at a user equipment (UE), first configuration information for reference signals for performing inter-carrier interference (ICI) estimation including time-frequency resources, a multiplexing pattern, a time-domain behavior, or some combination thereof. In some embodiments, the method 1100 includes receiving 1104 second configuration information for reporting ICI. The second configuration information includes instances of the reference signals for ICI estimation, the time-frequency resources for reporting, the time-domain behavior for reporting, or some combination thereof. In certain embodiments, the method 1100 includes measuring 1106 the ICI due to phase noise. In various embodiments, the method 1100 includes transmitting 1108 the ICI report. In some embodiments, the method 1100 includes receiving 1110 third configuration information for performing ICI pre-distortion and phase-tracking reference-signal (PT-RS) adaptation.

In certain embodiments, the method 1100 further comprises receiving fourth configuration information configuring a mobility status report, wherein the fourth configuration information comprises a mobility indication based on estimating a time variation of a downlink (DL) channel amplitude, Doppler over several DL slots, internal sensors, or some combination thereof. In some embodiments, the method 1100 further comprises receiving a downlink configuration information (DCI) configuration for the PT-RS and an indication to estimate a matrix of the ICI caused by phase noise. In various embodiments, the method 1100 further comprises receiving an indication to use a default PT-RS configuration to perform ICI matrix estimation.

In one embodiment, the method 1100 further comprises configuring a high density PT-RS in dedicated DL slots to perform accurate ICI estimation. In certain embodiments, the method 1100 further comprises configuring a common RS shared between multiple UEs, and using the RS in an allocated band and out of the allocated band to estimate ICI. In some embodiments, the method 1100 further comprises configuring resources to report the ICI in a physical uplink control channel (PUCCH) or a physical uplink shared channel (PUSCH).

In various embodiments, the method 1100 further comprises configuring reporting of a full ICI matrix for all PT-RS sub-carriers without a main diagonal. In one embodiment, the method 1100 further comprises configuring quantization of an ICI matrix by reporting some sub-diagonals adjacent to a main diagonal that contain highest ICI coefficients and performing averaging over the sub-diagonals to further quantize the ICI report. In certain embodiments, the method 1100 further comprises reporting ICI coefficients over multiple UL PUCCH slots or multiple UL PUSCH slots if the resources granted for one slot is not enough to carry the ICI report.

In some embodiments, the method 1100 further comprises receiving a configuration of PT-RSs based on a reported ICI and shared among a group of UEs with similar characteristics as a reporting UE. In various embodiments, the method 1100 further comprises receiving a transmission pre-distorted with a reported ICI after reporting a sub-set ICI or common phase shift for calibration of a mismatch of the phase noise. In one embodiment, the method 1100 further comprises receiving DCI with a PT-RS configuration based on reported ICI.

In certain embodiments, the method 1100 further comprises receiving an updated PT-RS configuration for uplink (UL) transmission and for DL transmission based on UL ICI estimation, downlink (DL) ICI estimation, or a combination thereof. In some embodiments, the reference signals comprise a PT-RS. In various embodiments, the reference signals are in addition to a PT-RS. In one embodiment, the reference signals comprise an enhanced CSI-RS.

Figure 12:
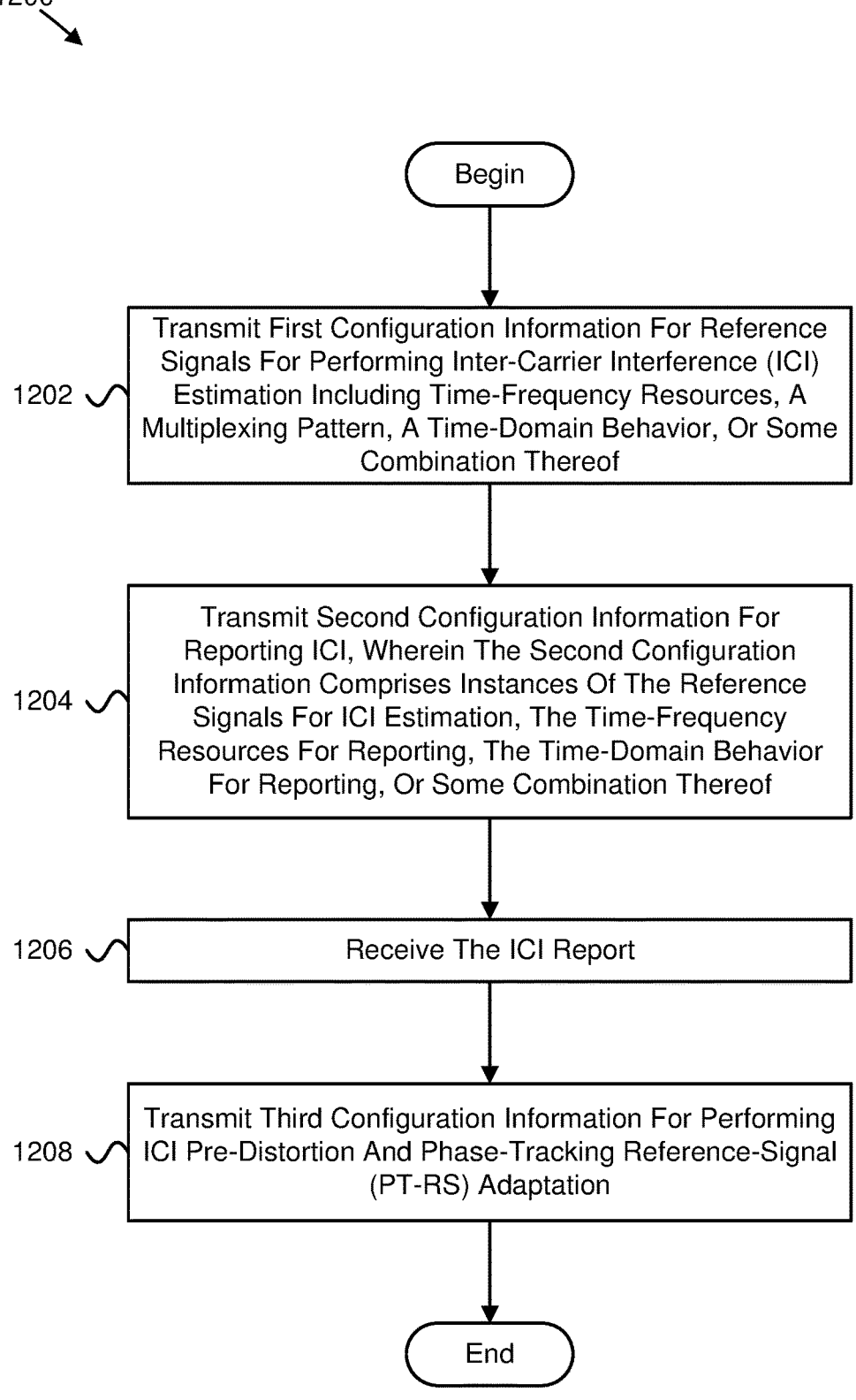
FIG. 12 is a flow chart diagram illustrating another embodiment of a method for configurations corresponding to inter-carrier interference.

FIG. 12 is a flow chart diagram illustrating another embodiment of a method 1200 for configurations corresponding to inter-carrier interference. In some embodiments, the method 1200 is performed by an apparatus, such as the network unit 104. In certain embodiments, the method 1200 may be performed by a processor executing program code, for example, a microcontroller, a microprocessor, a CPU, a GPU, an auxiliary processing unit, a FPGA, or the like.

In various embodiments, the method 1200 includes transmitting 1202, from a network device, first configuration information for reference signals for performing inter-carrier interference (ICI) estimation including time-frequency resources, a multiplexing pattern, a time-domain behavior, or some combination thereof. In some embodiments, the method 1200 includes transmitting 1204 second configuration information for reporting ICI. The second configuration information includes instances of the reference signals for ICI estimation, the time-frequency resources for reporting, the time-domain behavior for reporting, or some combination thereof. In certain embodiments, the method 1200 includes receiving 1206 the ICI report. In various embodiments, the method 1200 includes transmitting 1208 third configuration information for performing ICI pre-distortion and phase-tracking reference-signal (PT-RS) adaptation.

In certain embodiments, the method 1200 further comprises transmitting fourth configuration information configuring a mobility status report, wherein the fourth configuration information comprises a mobility indication based on estimating a time variation of a downlink (DL) channel amplitude, Doppler over several DL slots, internal sensors, or some combination thereof. In some embodiments, the method 1200 further comprises transmitting a downlink configuration information (DCI) configuration for the PT-RS and an indication to estimate a matrix of the ICI caused by phase noise. In various embodiments, the method 1200 further comprises transmitting an indication to use a default PT-RS configuration to perform ICI matrix estimation.

In one embodiment, the method 1200 further comprises receiving ICI coefficients over multiple UL PUCCH slots or multiple UL PUSCH slots if the resources granted for one slot is not enough to carry the ICI report. In certain embodiments, the method 1200 further comprises transmitting a configuration of PT-RSs based on a reported ICI and shared among a group of UEs with similar characteristics as a reporting UE. In some embodiments, the method 1200 further comprises transmitting a transmission pre-distorted with a reported ICI after reporting a sub-set ICI or common phase shift for calibration of a mismatch of the phase noise.

In various embodiments, the method 1200 further comprises transmitting DCI with a PT-RS configuration based on reported ICI. In one embodiment, the method 1200 further comprises transmitting an updated PT-RS configuration for uplink (UL) transmission and for DL transmission based on UL ICI estimation, downlink (DL) ICI estimation, or a combination thereof.

In certain embodiments, the reference signals comprise a PT-RS. In some embodiments, the reference signals are in addition to a PT-RS. In various embodiments, the reference signals comprise an enhanced CSI-RS.

In one embodiment, an apparatus comprises a user equipment (UE). The apparatus further comprises: a receiver that: receives first configuration information for reference signals for performing inter-carrier interference (ICI) estimation including time-frequency resources, a multiplexing pattern, a time-domain behavior, or some combination thereof: and receives second configuration information for reporting ICI, wherein the second configuration information comprises instances of the reference signals for ICI estimation, the time-frequency resources for reporting, the time-domain behavior for reporting, or some combination thereof: a processor that measures the ICI due to phase noise: and a transmitter that transmits the ICI report, wherein the receiver receives third configuration information for performing ICI pre-distortion and phase-tracking reference-signal (PT-RS) adaptation.

In certain embodiments, the receiver receives fourth configuration information configuring a mobility status report, and the fourth configuration information comprises a mobility indication based on estimating a time variation of a downlink (DL) channel amplitude, Doppler over several DL slots, internal sensors, or some combination thereof.

In some embodiments, the receiver receives a downlink configuration information (DCI) configuration for the PT-RS and an indication to estimate a matrix of the ICI caused by phase noise.

In various embodiments, the receiver receives an indication to use a default PT-RS configuration to perform ICI matrix estimation.

In one embodiment, the processor configures a high density PT-RS in dedicated DL slots to perform accurate ICI estimation.

In certain embodiments, the processor configures a common RS shared between multiple UEs, and using the RS in an allocated band and out of the allocated band to estimate ICI.

In some embodiments, the processor configures resources to report the ICI in a physical uplink control channel (PUCCH) or a physical uplink shared channel (PUSCH).

In various embodiments, the processor configures reporting of a full ICI matrix for all PT-RS sub-carriers without a main diagonal.

In one embodiment, the processor configures quantization of an ICI matrix by reporting some sub-diagonals adjacent to a main diagonal that contain highest ICI coefficients and performing averaging over the sub-diagonals to further quantize the ICI report.

In certain embodiments, the transmitter reports ICI coefficients over multiple UL PUCCH slots or multiple UL PUSCH slots if the resources granted for one slot is not enough to carry the ICI report.

In some embodiments, the receiver receives a configuration of PT-RSs based on a reported ICI and shared among a group of UEs with similar characteristics as a reporting UE.

In various embodiments, the receiver receives a transmission pre-distorted with a reported ICI after reporting a sub-set ICI or common phase shift for calibration of a mismatch of the phase noise.

In one embodiment, the receiver receives DCI with a PT-RS configuration based on reported ICI.

In certain embodiments, the receiver receives an updated PT-RS configuration for uplink (UL) transmission and for DL transmission based on UL ICI estimation, downlink (DL) ICI estimation, or a combination thereof.

In some embodiments, the reference signals comprise a PT-RS.

In various embodiments, the reference signals are in addition to a PT-RS.

In one embodiment, the reference signals comprise an enhanced CSI-RS.

In one embodiment, a method of a user equipment (UE) comprises: receiving first configuration information for reference signals for performing inter-carrier interference (ICI) estimation including time-frequency resources, a multiplexing pattern, a time-domain behavior, or some combination thereof: receiving second configuration information for reporting ICI, wherein the second configuration information comprises instances of the reference signals for ICI estimation, the time-frequency resources for reporting, the time-domain behavior for reporting, or some combination thereof: measuring the ICI due to phase noise: transmitting the ICI report: and receiving third configuration information for performing ICI pre-distortion and phase-tracking reference-signal (PT-RS) adaptation.

In certain embodiments, the method further comprises receiving fourth configuration information configuring a mobility status report, wherein the fourth configuration information comprises a mobility indication based on estimating a time variation of a downlink (DL) channel amplitude, Doppler over several DL slots, internal sensors, or some combination thereof.

In some embodiments, the method further comprises receiving a downlink configuration information (DCI) configuration for the PT-RS and an indication to estimate a matrix of the ICI caused by phase noise.

In various embodiments, the method further comprises receiving an indication to use a default PT-RS configuration to perform ICI matrix estimation.

In one embodiment, the method further comprises configuring a high density PT-RS in dedicated DL slots to perform accurate ICI estimation.

In certain embodiments, the method further comprises configuring a common RS shared between multiple UEs, and using the RS in an allocated band and out of the allocated band to estimate ICI.

In some embodiments, the method further comprises configuring resources to report the ICI in a physical uplink control channel (PUCCH) or a physical uplink shared channel (PUSCH).

In various embodiments, the method further comprises configuring reporting of a full ICI matrix for all PT-RS sub-carriers without a main diagonal.

In one embodiment, the method further comprises configuring quantization of an ICI matrix by reporting some sub-diagonals adjacent to a main diagonal that contain highest ICI coefficients and performing averaging over the sub-diagonals to further quantize the ICI report.

In certain embodiments, the method further comprises reporting ICI coefficients over multiple UL PUCCH slots or multiple UL PUSCH slots if the resources granted for one slot is not enough to carry the ICI report.

In some embodiments, the method further comprises receiving a configuration of PT-RSs based on a reported ICI and shared among a group of UEs with similar characteristics as a reporting UE.

In various embodiments, the method further comprises receiving a transmission pre-distorted with a reported ICI after reporting a sub-set ICI or common phase shift for calibration of a mismatch of the phase noise.

In one embodiment, the method further comprises receiving DCI with a PT-RS configuration based on reported ICI.

In certain embodiments, the method further comprises receiving an updated PT-RS configuration for uplink (UL) transmission and for DL transmission based on UL ICI estimation, downlink (DL) ICI estimation, or a combination thereof.

In some embodiments, the reference signals comprise a PT-RS.

In various embodiments, the reference signals are in addition to a PT-RS.

In one embodiment, the reference signals comprise an enhanced CSI-RS.

In one embodiment, an apparatus comprises a network device. The apparatus further comprises: a transmitter that: transmits first configuration information for reference signals for performing inter-carrier interference (ICI) estimation including time-frequency resources, a multiplexing pattern, a time-domain behavior, or some combination thereof: and transmits second configuration information for reporting ICI, wherein the second configuration information comprises instances of the reference signals for ICI estimation, the time-frequency resources for reporting, the time-domain behavior for reporting, or some combination thereof; and a receiver that receives the ICI report, wherein the transmitter transmits third configuration information for performing ICI pre-distortion and phase-tracking reference-signal (PT-RS) adaptation.

In certain embodiments, the transmitter transmits fourth configuration information configuring a mobility status report, and the fourth configuration information comprises a mobility indication based on estimating a time variation of a downlink (DL) channel amplitude, Doppler over several DL slots, internal sensors, or some combination thereof.

In some embodiments, the transmitter transmits a downlink configuration information (DCI) configuration for the PT-RS and an indication to estimate a matrix of the ICI caused by phase noise.

In various embodiments, the transmitter transmits an indication to use a default PT-RS configuration to perform ICI matrix estimation.

In one embodiment, the receiver receives ICI coefficients over multiple UL PUCCH slots or multiple UL PUSCH slots if the resources granted for one slot is not enough to carry the ICI report.

In certain embodiments, the transmitter transmits a configuration of PT-RSs based on a reported ICI and shared among a group of UEs with similar characteristics as a reporting UE.

In some embodiments, the transmitter transmits a transmission pre-distorted with a reported ICI after reporting a sub-set ICI or common phase shift for calibration of a mismatch of the phase noise.

In various embodiments, the transmitter transmits DCI with a PT-RS configuration based on reported ICI.

In one embodiment, the transmitter transmits an updated PT-RS configuration for uplink (UL) transmission and for DL transmission based on UL ICI estimation, downlink (DL) ICI estimation, or a combination thereof.

In certain embodiments, the reference signals comprise a PT-RS.

In some embodiments, the reference signals are in addition to a PT-RS.

In various embodiments, the reference signals comprise an enhanced CSI-RS.

In one embodiment, a method of a network device comprises: transmitting first configuration information for reference signals for performing inter-carrier interference (ICI) estimation including time-frequency resources, a multiplexing pattern, a time-domain behavior, or some combination thereof: transmitting second configuration information for reporting ICI, wherein the second configuration information comprises instances of the reference signals for ICI estimation, the time-frequency resources for reporting, the time-domain behavior for reporting, or some combination thereof: receiving the ICI report: and transmitting third configuration information for performing ICI pre-distortion and phase-tracking reference-signal (PT-RS) adaptation.

In certain embodiments, the method further comprises transmitting fourth configuration information configuring a mobility status report, wherein the fourth configuration information comprises a mobility indication based on estimating a time variation of a downlink (DL) channel amplitude, Doppler over several DL slots, internal sensors, or some combination thereof.

In some embodiments, the method further comprises transmitting a downlink configuration information (DCI) configuration for the PT-RS and an indication to estimate a matrix of the ICI caused by phase noise.

In various embodiments, the method further comprises transmitting an indication to use a default PT-RS configuration to perform ICI matrix estimation.

In one embodiment, the method further comprises receiving ICI coefficients over multiple UL PUCCH slots or multiple UL PUSCH slots if the resources granted for one slot is not enough to carry the ICI report.

In certain embodiments, the method further comprises transmitting a configuration of PT-RSs based on a reported ICI and shared among a group of UEs with similar characteristics as a reporting UE.

In some embodiments, the method further comprises transmitting a transmission pre-distorted with a reported ICI after reporting a sub-set ICI or common phase shift for calibration of a mismatch of the phase noise.

In various embodiments, the method further comprises transmitting DCI with a PT-RS configuration based on reported ICI.

In one embodiment, the method further comprises transmitting an updated PT-RS configuration for uplink (UL) transmission and for DL transmission based on UL ICI estimation, downlink (DL) ICI estimation, or a combination thereof.

In certain embodiments, the reference signals comprise a PT-RS.

In some embodiments, the reference signals are in addition to a PT-RS.

In various embodiments, the reference signals comprise an enhanced CSI-RS.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
at least one memory; and
at least one processor coupled with the at least one memory and configured to cause the UE to:
receive first configuration information for reference signals for performing inter-carrier interference (ICI) estimation including time-frequency resources, a multiplexing pattern, a time-domain behavior, or a combination thereof;
receive second configuration information for reporting ICI, wherein the second configuration information comprises instances of the reference signals for ICI estimation, the time-frequency resources for reporting, the time-domain behavior for reporting, or a combination thereof;
measure the ICI due to phase noise;
transmit an ICI report; and
receive third configuration information for performing ICI pre-distortion and phase-tracking reference-signal (PT-RS) adaptation.

2. The UE of claim 1, wherein the at least one processor is configured to cause the UE to receive fourth configuration information configuring a mobility status report, and the fourth configuration information comprises a mobility indication based on estimating a time variation of a downlink (DL) channel amplitude, Doppler over several DL slots, internal sensors, or a combination thereof.

3. The UE of claim 1, wherein the at least one processor is configured to cause the UE to receive a downlink configuration information (DCI) configuration for PT-RS and an indication to estimate a matrix of the ICI caused by phase noise.

4. The UE of claim 1, wherein the at least one processor is configured to cause the UE to configure a common RS shared between multiple UEs, and using the common RS in an allocated band and out of the allocated band to estimate ICI.

5. The UE of claim 1, wherein the at least one processor is configured to cause the UE to configure resources to report the ICI in a physical uplink control channel (PUCCH) or a physical uplink shared channel (PUSCH).

6. The UE of claim 1, wherein the at least one processor is configured to cause the UE to configure reporting of a full ICI matrix for all PT-RS sub-carriers without a main diagonal.

7. The UE of claim 1, wherein the at least one processor is configured to cause the UE to configure quantization of an ICI matrix by reporting some sub-diagonals adjacent to a main diagonal that contain highest ICI coefficients and performing averaging over the sub-diagonals to further quantize the ICI report.

8. The UE of claim 1, wherein the at least one processor is configured to cause the UE to report ICI coefficients over multiple UL PUCCH slots or multiple UL PUSCH slots if the time-frequency resources granted for one slot is not enough to carry the ICI report.

9. The UE of claim 1, wherein the at least one processor is configured to cause the UE to receive a configuration of PT-RSs based on a reported ICI and shared among a group of UEs with similar characteristics as a reporting UE.

10. The UE of claim 1, wherein the at least one processor is configured to cause the UE to receive a transmission pre-distorted with a reported ICI after reporting a sub-set ICI or common phase shift for calibration of a mismatch of the phase noise.

11. The UE of claim 1, wherein the at least one processor is configured to cause the UE to receive an updated PT-RS configuration for uplink (UL) transmission and for DL transmission based on UL ICI estimation, downlink (DL) ICI estimation, or a combination thereof.

12. The UE of claim 1, wherein the reference signals comprise a PT-RS, an enhanced CSI-RS, or a combination thereof.

13. The UE of claim 1, wherein the reference signals are in addition to a PT-RS.

14. A processor for wireless communication, comprising:
at least one controller coupled with at least one memory and configured to cause the processor to:
  receive first configuration information for reference signals for performing inter-carrier interference (ICI) estimation including time-frequency resources, a multiplexing pattern, a time-domain behavior, or a combination thereof;
  receive second configuration information for reporting ICI, wherein the second configuration information comprises instances of the reference signals for ICI estimation, the time-frequency resources for reporting, the time-domain behavior for reporting, or a combination thereof;
  measure the ICI due to phase noise;
  transmit an ICI report; and
  receive third configuration information for performing ICI pre-distortion and phase-tracking reference-signal (PT-RS) adaptation.

15. The processor of claim 14, wherein the at least one controller is configured to cause the processor to receive fourth configuration information configuring a mobility status report, and the fourth configuration information comprises a mobility indication based on estimating a time variation of a downlink (DL) channel amplitude, Doppler over several DL slots, internal sensors, or a combination thereof.

16. The processor of claim 14, wherein the at least one controller is configured to cause the processor to receive a downlink configuration information (DCI) configuration for the PT-RS and an indication to estimate a matrix of the ICI caused by phase noise.

17. The processor of claim 14, wherein the at least one controller is configured to cause the processor to configure a common RS shared between multiple UEs, and using the common RS in an allocated band and out of the allocated band to estimate ICI.

18. The processor of claim 14, wherein the at least one controller is configured to cause the processor to configure resources to report the ICI in a physical uplink control channel (PUCCH) or a physical uplink shared channel (PUSCH).

19. A base station, comprising:
at least one memory; and
at least one processor coupled with the at least one memory and configured to cause the base station to:
  transmit first configuration information for reference signals for performing inter-carrier interference (ICI) estimation including time-frequency resources, a multiplexing pattern, a time-domain behavior, or a combination thereof;
  transmit second configuration information for reporting ICI, wherein the second configuration information comprises instances of the reference signals for ICI estimation, the time-frequency resources for reporting, the time-domain behavior for reporting, or a combination thereof;
  receive an ICI report; and
  transmit third configuration information for performing ICI pre-distortion and phase-tracking reference-signal (PT-RS) adaptation.

20. A method performed by a user equipment (UE), the method comprising:
receiving first configuration information for reference signals for performing inter-carrier interference (ICI) estimation including time-frequency resources, a multiplexing pattern, a time-domain behavior, or a combination thereof;
receiving second configuration information for reporting ICI, wherein the second configuration information comprises instances of the reference signals for ICI estimation, the time-frequency resources for reporting, the time-domain behavior for reporting, or a combination thereof;
measuring the ICI due to phase noise;
transmitting an ICI report; and
receiving third configuration information for performing ICI pre-distortion and phase-tracking reference-signal (PT-RS) adaptation.

* * * * *